United States Patent
Abusleme et al.

(10) Patent No.: US 6,391,975 B1
(45) Date of Patent: May 21, 2002

(54) THERMOPLASTIC PERHALOGENATED (CO)POLYMERS OF CHLOROTRIFLUOROETHYLENE

(75) Inventors: Julio A. Abusleme, Saronno; Claudia Manzoni, Bologna, both of (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 09/612,284

(22) Filed: Jul. 7, 2000

(30) Foreign Application Priority Data

Jul. 9, 1999 (IT) .......................... MI99A1515

(51) Int. Cl.⁷ .................. C08L 27/04; C08L 33/14; C08F 2/46
(52) U.S. Cl. .................. 525/199; 525/200; 525/213; 525/214; 522/187
(58) Field of Search ................ 525/199, 200, 525/213, 214; 522/187

(56) References Cited

U.S. PATENT DOCUMENTS

| | | | |
|---|---|---|---|
| 4,025,709 A | 5/1977 | Blaise et al. | 526/225 |
| 4,155,953 A | 5/1979 | Tatemoto et al. | |
| 4,360,652 A | 11/1982 | Dohany | 526/210 |
| 4,513,129 A | 4/1985 | Nakagawa et al. | 526/249 |
| 4,789,717 A | 12/1988 | Giannetti et al. | 526/209 |
| 4,864,006 A | 9/1989 | Giannetti et al. | 526/209 |
| 5,021,516 A | 6/1991 | Wheland | 525/403 |
| 5,145,925 A | 9/1992 | Ihara et al. | 526/247 |
| 5,182,342 A | 1/1993 | Feiring et al. | 526/206 |
| 5,453,477 A | 9/1995 | Oxenrider et al. | 526/230 |
| 5,498,680 A | 3/1996 | Abusleme et al. | 526/209 |
| 5,569,723 A | 10/1996 | Abusleme et al. | 526/231 |

FOREIGN PATENT DOCUMENTS

| | | |
|---|---|---|
| EP | 0 185 242 A2 | 6/1986 |
| EP | 0 186 125 A2 | 7/1986 |
| EP | 0 450 613 A1 | 10/1991 |
| EP | 0 650 982 B1 | 5/1995 |
| EP | 0 697 766 A1 | 2/1996 |
| EP | 0 816 401 A1 | 1/1998 |

*Primary Examiner*—Nathan M. Nutter
(74) *Attorney, Agent, or Firm*—Arent Fox Kintner Plotkin & Kahn

(57) ABSTRACT

Chlorotrifluoroethylene (CTFE) thermoplastic perhalogenated polymers, formed by the following polymer components:

(I) 10–90% by weight of a CTFE homopolymer and (II) 90–10% by weight of a CTFE copolymer modified with comonomer (a) selected from one or more perfluoroalkyl vinylethers having the formula:

$$R_f\text{—O—CF}=CF_2$$

wherein:

$R_f$ is a $C_2$–$C_5$ perfluoroalkyl group, resulting in the final polymer (I)+(II), the amount of (a) being from 0,2 to 5% by moles and the CTFE the remaining part to 100% by moles.

28 Claims, No Drawings

THERMOPLASTIC PERHALOGENATED (CO)POLYMERS OF CHLOROTRIFLUOROETHYLENE

The present invention relates to thermoplastic perhalogenated polymers having a combination of improved mechanical properties.

Specifically the present invention relates to chlorotrifluoroethylene (CTFE) thermoplastic polymers modified with perfluoroalkylvinylethers, having a combination of improved mechanical properties, specifically at room temperature an improved combination of stress at break and strain at break without substantially affecting the yield stress, in comparison with the CTFE (PCTFE) homopolymer.

The polymers of the invention are to be used for obtaining manufactured articles such as pipes, sheets, films having the above mentioned characteristics.

It is known in the prior art that PCTFE is a fluorinated resin having excellent chemical resistance with good impermeability properties to gases and vapours, more specifically to oxygen, nitrogen and water vapour, but mechanical properties typical of a brittle material, i.e. high values of elastic modulus and yield stress combined with low values of stress and strain at break. As known the PCTFE polymers having a high viscosity, i.e., low Melt Flow Index (MFI) and high molecular weight show better mechanical properties than those having a low viscosity, i.e., high Melt Flow Index and low molecular weight. However the use of PCTFE having a very high viscosity is extremely difficult or unfeasible in the fluorinated thermoplastic processing for obtaining manufactured articles, such as pipes, sheets and films. Especially in the film processing, where the PCTFE for its characteristics is widely used in multilayer systems in food and pharmaceutical packaging products.

U.S. Pat. No. 5,145,925 describes a CTFE copolymer with a perfluoroalkylvinylether in an amount between 0.01 and 1% by moles; the preferred comonomer is perfluoropropylvinylether (FPVE). The all exemplified FPVE/CTFE copolymers, those with low (0.05% by moles) and high content (1.1% by moles) of modifying agent, show stresses at break lower than those of the homopolymer. In addition, the described copolymers containing less than 1% by moles of FPVE show elongations at break lower than 100%. The said elongation improves with the FPVE increase and the yield stress diminishes. Therefore a global improvement of the mechanical properties of the exemplified polymer in comparison with the CTFE homopolymer is not described.

The need was therefore felt to have available a thermoplastic perhalogenated PCTFE having besides the intrinsic homopolymer characteristics (chemical resistance and impermeability) a combination of mechanical properties of improved stresses and elongations at break and without substantially decreasing the yield stress in comparison with those of the homopolymer.

The Applicant has unexpectedly and surprisingly found that by the use of specific comonomers as hereinunder specified it is possible to obtain CTFE thermoplastic copolymers having an optimal combination of mechanical properties and characterized by a higher stress at break than those of the homopolymer and of the copolymers described in the prior art at a given MFI and modifier content.

An object of the present invention are therefore chlorotrifluoroethylene (CTFE) thermoplastic perhalogenated polymers, formed by the following polymer components:

(I) 10–90% by weight of a CTFE homopolymer and
(II) 90–10% by weight of a CTFE copolymer modified with comonomer (a) selected from one or more perfluoroalkyl vinylethers having the formula:

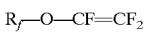

wherein:
$R_f$ is a $C_2$–$C_5$ perfluoroalkyl group, resulting in the final polymer (I)+(II), the amount of (a) being from 0,2 to 5% by moles and the CTFE the remaining part to 100% by moles.

Among the polymers of the invention, those having a $R_{MFI}$ lower than 0.3 or higher than 3, preferably lower than 0.2 or higher than 5, more preferably lower than 0.05 or higher than 20, are preferred.

With $R_{MFI}$ it is meant the Melt Flow Index ratio (MFI, measured at 265° C. and 10 kg of load according to the ASTM D 1238–88 method) of the polymer component (I) and of the final polymer (sum of the polymer components I and II).

The polymers of the invention having a $R_{MFI}$ lower than 0.3, preferably lower than 0.2, more preferably lower than 0.05 characterized in that the polymer component (II) contains more than 1% by moles of the perfluoroalkylvinylether of comonomer (a), are more preferred.

Among the perfluoroalkylvinylethers of formula (a) the perfluoroethylvinylether and the perfluoropropylvinylether (PPVE) are preferred.

The polymers object of the invention are CTFE thermoplastic polymers having a MFI higher than 0.1 g/10', preferably higher than 0.5 g/10', more preferably higher than 2 g/10'.

The polymer component (I) of the polymer of the invention preferably ranges from 30 to 70%, more preferably from 40 to 60% by weight.

The polymers of the invention can be obtained by blending powder or latex of components (I) and (II).

The polymers (components I and II) can be prepared by (co)polymerization of the corresponding monomers, in suspension in organic medium or in water or in aqueous emulsion in the presence of a radical initiator, at a temperature generally in the range −20° C.–150° C., preferably 10° C.–100° C., more preferably 10° C.–70° C. The reaction pressure is generally in the range 1.5–80 bar, preferably 3–37 bar, still more preferably 4–26 bar.

As initiator any compound able to generate active radicals at the selected (co)polymerization temperature can be used. The various radical initiators can be selected from:

(i) bis-acylperoxides of formula $(R_f—CO—O)_2$ wherein $R_f$ is a $C_1$–$C_{10}$ (per)haloalkyl (see for example EP 185,242 and U.S. Pat. No. 4,513,129), or a perfluoropolyoxyalkylene group (see for example EP 186,215 and U.S. Pat. No. 5,021,516); among them, bis-trichloroacetylperoxide and bis-dichlorofluoroacetylperoxide (see U.S. Pat. No. 5,569,728), are particularly preferred;

(ii) inorganic peroxides soluble in water, such as monovalent cation persulphates or perphosphates; sodium and potassium persulphates are particularly preferred;

(iii) organic or inorganic redox systems, such as potassium persulphate/sodium sulphite, terbutylhydroperoxide/methabisulphite (see U.S. Pat. No. 5,453,477).

In the case of the suspension (co)polymerization, the reaction medium is formed of an organic phase, to which water is sometimes added in order to favour the heat dispersion which develops during the reaction. The organic phase can be formed of the monomers themselves, without addition of solvents, or of the monomers dissolved in a suitable organic solvent. As organic solvents chlorofluorocarbons, such as $CCl_2F_2$ (CFC-12), $CCl_3F$ (CFC-11), $CCl_2FCClF_2$ (CFC-113), $CClF_2CClF_2$ (CFC-114), etc. are conventionally used. Since such products have a destroying effect on the ozone present in the stratosphere, alternative products, such as the compounds containing only carbon, fluorine, hydrogen, and optionally oxygen, described in U.S. Pat. No. 5,182,342, have been proposed. In particular fluoropolyethers with at least one hydrogenated end group, preferably two, of the $-CF_2H$, $-CF_2CF_2H$, $-CF(CF_3)H$ type, can be used.

The usable amount of the radical initiator is the standard one for the (co)polymerization of fluorinated olefinic monomers, and is generally in the range 0.003%–10% by weight with respect to the total amount of (co)polymerized monomers.

In the case of the emulsion (co)polymerization, the reaction is carried out in the presence of a suitable surfactant, see for example those described in U.S. Pat. Nos. 4,360,652 and 4,025,709, so as to give to a stable emulsion. They are generally fluorinated surfactants, selected from the compounds of general formula:

$$R_f - X^- M^+$$

wherein $R_f$ is a $C_5-C_{14}$ (per)fluoroalkyl chain or a (per)fluoropolyoxyalkylene chain, $X^-$ is $-COO^-$ or $-SO_3^-$, $M^+$ is selected from: $H^+$ and one alkaline metal ion. Among those commonly used we remember: sodium perfluoro-octanoate; (per)fluoropolyoxyalkylenes ended with one or more carboxylic groups; sulphonic acid salts of formula $R_{f'}-C_2H_4SO_3H$, wherein $R_{f'}$ is a $C_4-C_{10}$ perfluoroalkyl (see U.S. Pat. No. 4,025,709); etc.

Preferred surfactants are those, wherein $M^+$ is selected between $Na^+$ and $K^+$, preferably $K^+$, which, when combined with inorganic initiators of $Na^+$ and $K^+$, preferably $K^+$, give non-discolored polymers.

The preferred methods to control the molecular weights of the polymers, components (I) and (II), are:

I') Control the concentration of the free radicals in the reaction medium; an increase of the free radical concentration during the polymerization determines a viscosity decrease (MFI increase) and viceversa;

II') Control the polymerization temperature; a temperature increase determines a viscosity decrease (MFI increase) and viceversa;

or their combination.

To obtain a high molecular weight (low MFI), a low synthesis temperature (10° C.–30° C.) combined with a low concentration of free radicals coming from the initiator, is preferred; viceversa to obtain a low molecular weight (high MFI), an high synthesis temperature (60° C.–80° C.) combined with an high concentration of free radicals coming from the initiator, is preferred.

When chain transfer agents for obtaining low molecular weights are used, these can preferably be halogenated hydrocarbons, for example chloroform or HCFC 123 and ethane or methane. The transfer agent amount can range within rather wide limits, depending on the reaction temperature and the molecular weight target. Generally, such amount ranges from 0.001 to 5% by weight, preferably from 0.05 to 1% by weight, with respect to the total amount of monomers introduced to the reactor.

The process object of the present invention can be advantageously carried out in the presence of perfluoropolyoxyalkylene dispersions, emulsions or microemulsions, according to U.S. Pat. Nos. 4,789,717 and 4,864,006, or also of fluoropolyoxyalkylene microemulsions having hydrogenated end groups and/or hydrogenated repeating units, according to U.S. Pat. No. 5,498,680.

The polymerization can also be carried out by using a radical photoinitiator in the presence of visible ultraviolet radiation, either in suspension in organic medium or in water or in emulsion/microemulsion, according to what described in European patents EP 650,982 and EP 697,766 in the name of the Applicant, herein incorporated by reference.

From an operating point of view, thermally stable photoinitiators at the polymerization temperature and also at room temperature are preferred, and among them, perhalogenated organic peroxides or inorganic such as potassium persulphate or sodium persulphate are particularly preferred.

The preferred process according to the present invention is carried out in (per)fluoropolyoxyalkylene microemulsion, wherein the surfactant is a $Na^+$ or $K^+$ salt, preferably $K^+$, and in the presence of an inorganic $Na^+$ or $K^+$ initiator, preferably potassium persulphate.

The preferred preparation process of the polymers of the invention is the polymerization of component (I) or component (II) in presence of component (II) or component (I) respectively, as above defined both components (I) and (II). The most preferred preparation process of the polymers of the invention is the synthesis of component (II) in presence of component (I), as above defined.

As already said, the polymers of the present invention are used for preparing manufactured articles, specifically pipes, sheets and films.

The second melting temperature ($T_{2f}$) and the crystallization temperature ($T_{xx}$) are determined by differential scanning calorimetry (DSC).

The monomer composition has been determined by $^{19}$-F-NMR.

The mechanical properties, obtained according to ASTM D 1708, using compression-molded specimen, are reported in Table.

The discoloration is determined through the observation of the strands obtained after 20, 40 and 60 minutes of residence time of the polymer in the MFI machine at 265° C. Discoloration means the coloration of the extruded polymer. The product not showing discoloration is colourless or white. Polymers showing discoloration are generally yellowish or brown. The skilled in the art is able to determine if the polymer shows or not discoloration, also using methods measuring the colour index such as for example the white or yellow index.

The following examples are given for illustrative purposes and are not limitative of the present invention.

EXAMPLE 1

On a 2 1 AISI 316 autoclave side wall, equipped with stirrer working at 400 rpm, a quartz window has been inserted, in correspondence of which a Hanau® TQ-150 type UV lamp has been placed. It is a high pressure mercury lamp which emits radiation in the range 240–600 nm, with a 13.2 W power for the radiation in the 240–330 nm range.

The autoclave has been evacuated and therein were introduced in sequence:

1200 g of demineralized $H_2O$;

14 g of a microemulsion formed of: 20% by weight of Galden® D02, having the formula:

$$CF_3O-(CF_2CF(CF_3)O)_m(CF_2O)_n-CF_3$$

having m/n=20 and average molecular weight of 450; 40% by weight of a surfactant having the formula:

$$(C_3ClF_6O)-(CF_2CF(CF_3)O)_{m1}-(CF_2O)_{n1}-CF_2COO^-K^+$$

having m1/n1=82.7 and average molecular weight of 527;

the remaining part being formed by $H_2O$ ;

3.0 g of potassium persulphate dissolved in 200 g of demineralized $H_2O$.

For the synthesis of the homopolymer component (I) 200 g of CTFE were then introduced in the autoclave between 1° C. and 5° C. Then the autoclave was heated to the reaction temperature of 20° C. The UV lamp was then switched on. After 285 minutes the pressure of 4 absolute bar was reached and the lamp was switched off. Then for the synthesis of the copolymer component (II), additional 200 g of CTFE and 33 g of perfluoropropylvinylether were fed. The autoclave was heated to a temperature of 50° C.

After 795 minutes on the whole a 4 absolute bar pressure was reached. The unreacted monomers were removed and the latex discharged from the autoclave at room temperature, having a concentration of 273 g/l of water, was cryogenically coagulated, then the polymer was separated, washed with water and dried at 150° C. for about 16 hours.

The characteristics of the obtained polymer and the mechanical properties at room temperature are reported in Table 1.

MFI Determination of the Homopolymer Component (I)

The synthesis of the homopolymer component (I) was repeated. After 300 minutes a pressure of. 4 absolute bar was reached and the lamp was switched off. The unreacted monomers were removed and the latex discharged from the autoclave at room temperature, having a concentration of 126 g/l of water, was cryogenically coagulated, then the polymer was separated, and dried at 150° C. for about 16 hours. The obtained MFI is 0.0 g/10'.

No discoloration of the obtained strands after 60 minutes of residence time in the MFI machine at 265° C., was observed.

EXAMPLE 2

On a 2 l AISI 316 autoclave side wall, equipped with stirrer working at 400 rpm, a quartz window has been inserted, in correspondence of which a Hanau® TQ-150 type UV lamp has been placed. It is a high pressure mercury lamp which emits radiation in the range 240–600 nm, with a 13.2 W power for the radiation in the 240–330 nm range.

The autoclave has been evacuated and therein were introduced in sequence:

1200 g of demineralized $H_2O$;

14 g of a microemulsion formed of: 20% by weight of Galden® D02, having the formula:

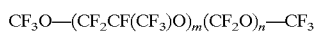

$CF_3O-(CF_2CF(CF_3)O)_m(CF_2O)_n-CF_3$ having m/n=20 and average molecular weight of 450; 40% by weight of a surfactant having the formula:

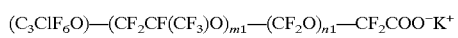

$(C_3ClF_6O)-(CF_2CF(CF_3)O)_{m1}-(CF_2O)_{n1}-CF_2COO^-K^+$ having m1/n1=82.7 and average molecular weight of 527;

the remaining part being formed by $H_2O$;

3.0 g of potassium persulphate dissolved in 200 g of demineralized $H_2O$.

For the synthesis of the homopolymer component (I) 200 g of CTFE were then introduced in the autoclave between 1° C. and 5° C. Then the autoclave was heated to the reaction temperature of 50° C. After 205 minutes the pressure of 7 absolute bar was reached. The autoclave was then brought to the reaction temperature of 20° C. Then for the synthesis of the copolymer component (II) additional 200 g of CTFE and 27 g of perfluoropropylvinylether were fed. The UV lamp was then switched on.

After 1,020 minutes on the whole a pressure of 4 absolute bar was reached. The lamp was switched off and the unreacted monomers were removed and the latex discharged from the autoclave at room temperature, having a concentration of 236 g/l of water, was cryogenically coagulated, then the polymer was separated, washed with water and dried at 150° C. for about 16 hours.

The characteristics of the obtained polymer and the mechanical properties at room temperature are reported in Table 1.

MFI Determination of the Homopolymer Component (I)

The synthesis of the homopolymer component (I) was repeated. After 250 minutes a pressure of 7 absolute bar was reached and the lamp was switched off. The unreacted monomers were removed and the latex discharged from the autoclave at room temperature, having a concentration of 120 g/l of water, was cryogenically coagulated, then the polymer was separated, and dried at 150° C. for about 16 hours. The obtained MFI is 5.2 g/l10'.

EXAMPLE 3

In a 18 l enamelled autoclave equipped with baffles and stirrer working at 450 rpm, 8 l of demineralized water and 4 kg of chlorotrifluoroethylene (CTFE) were introduced. For the synthesis of the homopolymer component (I) the autoclave was heated to the reaction temperature of 20° C. corresponding to an initial pressure of 6 absolute bar. In the autoclave the radical initiator under the form of a trichloroacetylperoxide (TCAP) solution in CFC-113, maintained at −17° C., having a titre equal to 0.12 g TCAP/ml, was then fed in a continuous way with a flow-rate of 6 ml/h for a reaction time of 270 minutes.

Then for the synthesis of the copolymer component (II) 320 g of perfluoropropylvinylether have ben introduced and the initiator flow-rate was increased to 15 ml/h. The polymerization lasted on the whole 540 minutes. When the reaction was over, the unreacted monomers were removed and the product discharged from the autoclave was dried at 120° C. for about 16 hours. The amount of the obtained dry product was 485 g.

The characteristics of the obtained polymer and the mechanical properties at room temperature are reported in Table 1.

MFI Determination of the Homopolymer Component (I)

The synthesis of the homopolymer component (I) was repeated. At the end of the reaction the unreacted monomers were removed and the product discharged from the autoclave was dried at 120° C. for about 16 hours.

The amount of the obtained dry product was 120 g. The obtained MFI is 2.1 g/10'.

EXAMPLE 4

Comparative

The same autoclave of Example 1 has been evacuated and therein were introduced in sequence:

1200 g of demineralized $H_2O$;

14 g of a microemulsion formed of: 20% by weight of Galden® D02, having the formula:

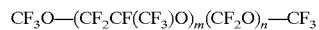

$CF_3O-(CF_2CF(CF_3)O)_m(CF_2O)_n-CF_3$ having m/n=20 and average molecular weight of 450; 40% by weight of a surfactant having the formula:

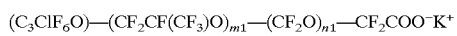
$(C_3ClF_6O)-(CF_2CF(CF_3)O)_{m1}-(CF_2O)_{n1}-CF_2COO^-K^+$ having m1/n1=82.7 and average molecular weight of 527;

the remaining part being formed by $H_2O$;

3.0 g of potassium persulphate dissolved in 200 g of demineralized $H_2O$.

400 g of CTFE and 33 g of perfluoropropylvinylether were then introduced in the autoclave between 1° C. and 5° C. Then the autoclave was heated to the reaction temperature of 50° C. After 500 minutes the pressure of 7 absolute bar was reached.

The unreacted monomers were removed and the latex discharged from the autoclave at room temperature, having a concentration of 268 g/l of water, was cryogenically coagulated, then the polymer was separated and dried at 150° C. for about 16 hours.

The characteristics of the obtained polymer and the mechanical properties at room temperature are reported in Table 1.

EXAMPLE 5

Comparative

Example 4 was repeated except that 300 g of CTFE, 6.5 g of perfluoropropylvinylether were introduced, the reaction temperature was brought to 20° C. and the UV lamp of the Hanau® TQ-150 type placed in correspondence of the quartz window was switched on. It is a high pressure mercury lamp which emits radiation in the range 240–600 nm, with a 13.2 W power for the radiation in the 240–330 nm range. After 515 minutes the pressure of 4 absolute bar was reached and the lamp was switched off.

The unreacted monomers were removed and the latex discharged from the autoclave at room temperature, having a concentration of 198 g/l of water, was cryogenically coagulated, then the polymer was separated, and dried at 150° C. for about 16 hours.

The characteristics of the obtained polymer and the mechanical properties at room temperature are reported in Table 1.

EXAMPLE 6

Comparative

In a 18 l enamelled autoclave equipped with baffles and stirrer working at 450 rpm, 8 l of demineralized water, 4 kg of chlorotrifluoroethylene (CTFE) and 160 g of perfluoropropylvinylether were introduced. Then the autoclave was heated to the reaction temperature of 20° C. corresponding to an initial pressure of 6 absolute bar. In the autoclave the radical initiator under the form of a trichloroacetylperoxide (TCAP) solution in CFC-113, maintained at −17° C., having a titre equal to 0.12 g TCAP/ml, was then fed in a continuous way with a flow-rate of 30 ml/h for a reaction time of 540 minutes.

When the reaction was over, the unreacted monomers were removed and the product discharged from the autoclave was dried at 120° C. for about 16 hours. The amount of the obtained dry product was 950 g.

The characteristics of the obtained polymer and the mechanical properties at room temperature are reported in Table 1.

EXAMPLE 7

Comparative

In a 18 l enamelled autoclave equipped with baffles and stirrer working at 450 rpm, 5 l of demineralized water and 8 kg of chlorotrifluoroethylene (CTFE) were introduced.

Then the autoclave was heated to the reaction temperature of 20° C. corresponding to an initial pressure of 6 absolute bar.

In the autoclave the radical initiator under the form of a trichloroacetylperoxide (TCAP) solution in CFC-113, maintained at −17° C., having a titre equal to 0.11 g TCAP/ml, was then fed in a continuous way with a flow-rate of 6 ml/h during the whole duration of the polymerization (9 hours).

The product discharged from the autoclave was dried at 120° C. for about 16 hours. The amount of the obtained dry product was 550 g.

The characteristics of the obtained polymer and the mechanical properties at room temperature and at high temperatures are reported in Table 1.

EXAMPLE 8

Comparative

Example 7 was repeated except that in the autoclave the radical initiator under the form of a trichloroacetylperoxide (TCAP) solution in CFC-113, maintained at −17° C., having a titre equal to 0.09 g TCAP/ml, was fed in a continuous way with a flow-rate of 22 ml/h during the whole duration of the polymerization (9 hours).

The product discharged from the autoclave was dried at 120° C. for about 16 hours. The amount of the obtained dry product was 940 g.

The characteristics of the obtained polymer and the mechanical properties at room temperature and at high temperatures are reported in Table 1.

EXAMPLE 9

Comparative

Example 7 was repeated except that in the autoclave the radical initiator under the form of a trichloroacetylperoxide (TCAP) solution in CFC-113, maintained at −17° C., having a titre equal to 0.11 g TCAP/ml, was fed in a continuous way with a flow-rate of 32 ml/h during the whole duration of the polymerization (9 hours).

The product discharged from the autoclave was dried at 120° C. for about 16 hours. The amount of the obtained dry product was 1,301 g.

The characteristics of the obtained polymer and the mechanical properties at room temperature and at high temperatures are reported in Table 1.

The comparison of the invention polymers with those of the prior art must be made at equal MFI values and at equal FPVE content.

As known, it can be noticed also from Table 1 that the CTFE homopolymers (comparative Examples 7–9), have mechanical properties which remarkably worsen as MFI increases.

The polymers of the present invention all have stresses and elongations at break clearly better than the CTFE homopolymers and the CTFE/FPVE copolymers described in Examples 4–6, even maintaining an optimal global set of the other mechanical properties, in particular maintaining good yield stress values.

TABLE 1

| EXAMPLE | 1 | 2 | 3 | 4(*) | 5(*) | 6(*) | 7(*) | 8(*) | 9(*) |
|---|---|---|---|---|---|---|---|---|---|
| FPVE (% by moles) | 1.51 | 0.37 | 0.3 | 1.6 | 0.38 | 0.3 | — | — | — |
| MFI (g/10') | 7.7 | 0.49 | 9.6 | 9.8 | 0.47 | 9.6 | 0.3 | 3.4 | 7.7 |
| $R_{MFI}$ | 0.0 | 10.6 | 0.22 | — | — | — | — | — | — |
| $T_{2f}$ (° C.) | 204.9 | 209.3 | 208.6 | 197.1 | 206.8 | 207.2 | 213.2 | 213.4 | 213.3 |
| $T_{xx}$ (° C.) | 169.9 | 176.4 | 167.0 | 162.0 | 172.4 | 170.6 | 169.6 | 170.5 | 177.9 |
| Mechanical properties at 23° C. | | | | | | | | | |
| Elastic modulus (MPa) | 1229 | 1233 | 1164 | 1195 | 1242 | 1334 | 1334 | 1550 | 1331 |
| Yield stress (MPa) | 39.5 | 40.2 | 39.8 | 35.6 | 39.8 | 44.4 | 42.1 | 43.8 | 45.1 |
| Yield strain (%) | 5.9 | 7.0 | 7.1 | 7.0 | 6.0 | 5.9 | — | — | — |
| Stress at break (MPa) | 41.2 | 40.9 | 24.7 | 33.5 | 33.9 | 21.6 | 34.3 | 29.2 | 24.8 |
| Strain at break (%) | 190 | 170 | 114 | 154 | 69 | 32 | 127 | 65.3 | 40 |

(*)comparative

What is claimed is:

1. Chlorotrifluoroethylene (CTFE) thermoplastic perhalogenated polymers, formed by the following polymer components:
   (I) 10–90% by weight of a CTFE homopolymer and
   (II) 90–10% by weight of a CTFE copolymer modified with comonomer (a) selected from one or more perfluoroalkyl vinylethers having the formula:

$R_f$—O—CF=CF$_2$ wherein:
   $R_f$ is a $C_2$–$C_5$ perfluoroalkyl group, resulting in the final polymer (I)+(II), the amount of (a) being from 0,2 to 5% by moles and the CTFE the remaining part to 100% by moles.

2. Polymers according to claim 1 having a $R_{MFI}$ lower than 0.3 or higher than 3, the $R_{MFI}$ being the Melt Flow Index ratio (MFI), measured at 265° C. and 10 kg of load according to the ASTM D 1238–88 method, of polymer component (I) and of the final polymer, sum of components I and II.

3. Polymers according to claim 2 having a $R_{MFI}$ lower than 0.2, characterized in that polymer component (II) contains more than 1% by moles of the fluoroalkylvinylether of (a).

4. Polymers according to claim 1, wherein the perfluoroalkylvinylether of formula (a) is perfluoropropylvinylether (FPVE).

5. Polymers according to claim 1 having a MFI higher than 0.1 g/10'.

6. Polymers according to claim 1, wherein the polymer component (I) ranges from 30 to 70%.

7. A process for preparing the polymer compounds according to claim 1, by (co)polymerization of the corresponding monomers, in suspension in organic medium or in water or in aqueous emulsion in the presence of a radical initiator, at a temperature in the range −20° C.–150° C.

8. A process according to claim 7, wherein the radical initiators are selected from:
   (i) bis-acylperoxides of formula $(R_f$—CO—O$)_2$ wherein $R_f$ is a $C_1$–$C_{10}$ (per)haloalkyl, or a perfluoropolyoxyalkylene group;
   (ii) inorganic peroxides soluble in water;
   (iii) organic or inorganic redox systems.

9. A process according to claim 7, wherein the (co)polymerization is carried out in emulsion in the presence of fluorinated surfactants, selected from the products of formula $R_f$—X$^-$M$^+$ wherein $R_f$ is a $C_5$–$C_{14}$ (per)fluoroalkyl chain or a (per)fluoropolyoxyalkylen chain, X$^-$ is —COO$^-$ or —SO$_3^-$, M$^+$ is selected from: H$^+$ and an alkaline metal ion.

10. A process according to claim 7, wherein the polymerization is carried out in the presence of perfluoropolyoxyalkylenes dispersions, emulsions or microemulsions or of fluoropolyoxyalkylene microemulsions having hydrogenated end groups and/or hydrogenated repeating units.

11. A process according to claim 7, wherein the polymerization is carried out by using a radical photoinitiator in the presence of visible ultraviolet radiation.

12. A process according to claim 9, wherein the surfactant is a Na$^+$ or K$^+$ salt, preferably K$^+$, and the initiator an inorganic Na$^+$ or K$^+$ salt, preferably potassium persulphate.

13. A preparation process according to claim 7 of the chlorotrifluoroethylene (CTFE) thermoplastic perhalogenated polymers, formed by the polymers components (I) and (II) according to claims 1–6, in which component (I) or component (II) are synthesized in presence of component (II) or component (I) respectively.

14. A method of obtaining chlorotrifluoroethylene thermoplastic copolymers of optimal mechanical properties and a higher stress at break than corresponding homopolymers, and copolymers used to form pipes, sheets, films, and molded articles, comprising copolymerizing in the presence of a radical initiator, polymers, formed by the following polymer components:
   (I) 10–90% by weight of a chlorotrifluoroethylene (CTFE) homopolymer and
   (II) 90–10% by weight of a CTFE copolymer modified with comonomer (a) selected from one or more perfluoroalkyl vinylethers having the formula:

$R_f$—O—CF=CF$_2$ wherein
   $R_f$ is a $C_2$–$C_5$ perfluoroalkyl group, resulting in the final polymer (I)+(II), the amount of (a) being from 0,2 to 5% by moles and the CTFE the remaining part to 100% by moles.

15. Manufactured pipes, sheets, films, and molded articles comprised of chlorotrifluoroethylene thermoplastic copolymers comprising chlorotrifluoroethylene (CTFE) thermoplastic perhalogenated polymers, formed by the following polymer components:
   (I) 10–90% by weight of a CTFE homopolymer and
   (II) 90–10% by weight of a CTFE copolymer modified with comonomer (a) selected from one or more perfluoroalkyl vinylethers having the formula:

$$R_f\text{—}O\text{—}CF{=}CF_2$$

wherein

R$_f$ is a C$_2$–C$_5$ perfluoroalkyl group, resulting in the final polymer (I)+(II), the amount of (a) being from 0,2 to 5% by moles and the CTFE the remaining part to 100% by moles, said chlorotrifluoroethylene thermoplastic copolymers having optimal mechanical properties and a higher stress at break than corresponding homopolymers and copolymers.

16. The polymers according to claim 2, wherein the polymers have a R$_{MFI}$ lower than 0.2 or higher than 5.

17. The polymers according to claim 16, wherein the polymers have a R$_{MFI}$ lower than 0.05 or higher than 20.

18. The polymers according to claim 3, wherein the polymers have a R$_{MFI}$ lower than 0.05.

19. The polymers according to claim 5, wherein the polymers have a MFI higher than 0.5 g/10'.

20. The polymers according to claim 19, wherein the polymers have a MFI higher than 2 g/10'.

21. The polymers according to claim 6, wherein the polymer component (I) ranges from 40 to 60% by weight.

22. The process for preparing the polymer compounds according to claim 7, at a temperature in the range 0° C.–100° C.

23. The process for preparing the polymer compounds according to claim 22, at a temperature in the range 10° C.–70° C.

24. The process according to claim 8, wherein the (i) bis-acylperoxides of formula (R$_f$—CO—O)$_2$ are selected from bis-trichloroacetylperoxide and bis-dichlorofluoroacetylperoxide.

25. The process according to claim 8, wherein the (ii) inorganic peroxides soluble in water are selected from persulphates and perphosphates of monovalent cations.

26. The process according to claim 25, wherein the persulphates are selected from sodium and potassium persulphates.

27. The process according to claim 8, wherein the (iii) organic or inorganic redox systems are selected from potassium persulphate/sodium sulphite and terbutylhydroperoxide/methabisulphite.

28. The preparation process according to claim 13, wherein component (II) is synthesized in presence of component (I).

* * * * *